United States Patent [19]

Gentile

[11] Patent Number: 4,928,232
[45] Date of Patent: May 22, 1990

[54] SIGNAL AVERAGING FOR OPTICAL TIME DOMAIN RELECTOMETERS

[75] Inventor: John R. Gentile, Frankfort, N.Y.

[73] Assignee: Laser Precision Corporation, Utica, N.Y.

[21] Appl. No.: 285,026

[22] Filed: Dec. 16, 1988

[51] Int. Cl.$^5$ ............................................. G01M 11/00
[52] U.S. Cl. .................................... 364/525; 356/73.1
[58] Field of Search ............... 356/73.1; 364/473, 525, 364/554, 487

[56] References Cited

U.S. PATENT DOCUMENTS 4,812,038  3/1989  Nazarathy et al. ................. 356/73.1

FOREIGN PATENT DOCUMENTS 0068078  1/1983  European Pat. Off. ........... 356/73.1
0122953  10/1984  European Pat. Off. ........... 356/73.1

Primary Examiner—Parshotam S. Lall
Assistant Examiner—Steven A. Melnick
Attorney, Agent, or Firm—Thomas J. Plante

[57] ABSTRACT

Means for digitizing and averaging the signals in an optical time domain reflectometer are disclosed in which a comparator is used to output a 1 or 0 into an arbitrarily large number of successive time-bins. In each comparator choice, the analog voltage signal from the OTDR receiver is compared to a selected analog voltage value. The selected value is chosen randomly from the range of available signals in the interval of interest; and each such valve is used to provide a comparator input into every time-bin during one waveform recovery.

Each comparator output signal (1 or 0) is directed to a separate time-bin (counter), representing the desired time interval (resolution). Subsequent comparator output signals are added to each time bin. The waveform recovery runs are repeated until an acceptable signal-to-noise result is achieved. Each waveform run uses a different voltage for comparison to the receiver voltage. Such comparison voltages may be selected by a random generator; or an ordered series of comparison voltages may be used.

9 Claims, 5 Drawing Sheets

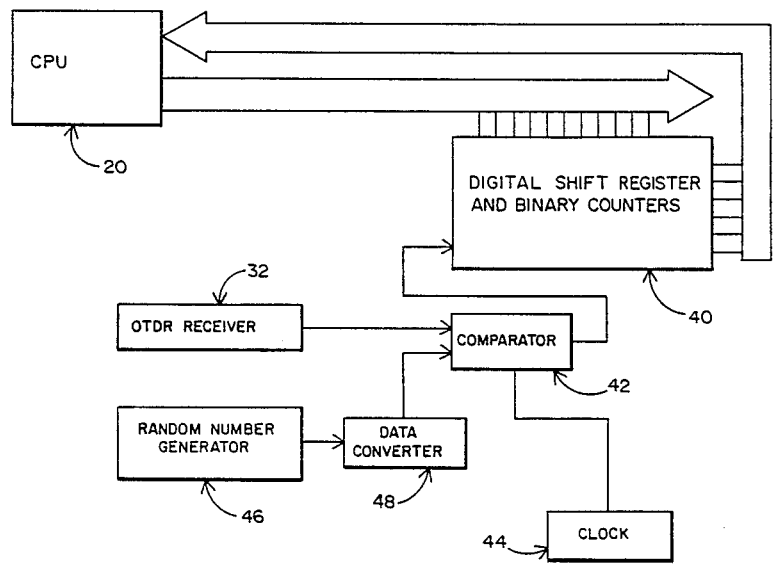

SIGNAL AVERAGING FOR OPTICAL TIME DOMAIN RELECTOMETERS

BACKGROUND OF THE INVENTION

This invention relates to optical time domain reflectometers (OTDRs), and specifically to the averaging means used to extract, from a high noise level, the signals of interest to the OTDR.

Repetitive firings of a laser from an OTDR into one end of a fiber optic strand cause a return to the OTDR of analog signals representing the reflection characteristics along the length of the strand. The waveform displaying these reflection characteristics is corrupted by noise. The waveform must be recovered to some arbitrary degree of accuracy. The typical means by which this is done is digitizing the waveform, by sampling it periodically and co-adding the results. This technique improves the signal-to-noise ratio by the logarithm of the number of waveforms co-added. In the technique used in present OTDRs, the waveform is digitized with a "flash" converter. Then from very fast static RAM's, the accumulated value of the point being measured is recalled. The latest point is added to this data, and placed back in memory. The next point on the waveform is digitized, and so on.

The problem with this method is that there is a limit to how finely the waveform can be digitized in time. It takes about 80 nanoseconds (nS) to digitize the signal, change the RAM address, wait for the addition to occur, and then place the result back in memory. To get finer resolution it is necessary to first average a set of data with 80 nS data spacing, and then run a new set of data with the sampling process offset in time by the desired amount. For example, 16 sets of averages must be performed to get a desired 5 nS time resolution. Needless to say, this approach is cumbersome and time consuming, and requires a good deal of circuitry to implement. The fast digital ICs required also consume a great deal of power.

SUMMARY OF THE INVENTION

The present invention performs the digitizing and averaging functions for an OTDR signal by using a comparator to output a 1 or 0 into an arbitrarily large number of successive time-bins. In each comparator choice, the analog voltage signal from the OTDR receiver is compared to a selected analog voltage value. The selected value is chosen randomly from the range of available signals in the interval of interest; and each such value is used to provide a comparator input into every time-bin during one waveform recovery.

Each comparator output signal (1 or 0) is directed to a separate time-bin (counter), representing the desired time interval (resolution). Subsequent comparator output signals are added to each time bin. The waveform recovery runs are repeated until an acceptable signal-to-noise result is achieved. Each waveform run uses a different voltage for comparison to the receiver voltage. Such comparison voltages may be selected by a random generator; or an ordered series of comparison voltages may be used.

The number of time-bins for a given fiber optic length may be made arbitrarily large. By repeating the number of laser firings a sufficiently large number of times, a value in each time bin can be obtained which has a very high degree of accuracy. Usually, thousands of such trial firings should be used in generating the OTDR display curve.

The advantages of this (stochastic-ergodic) method of recovering an OTDR waveform, over the method used heretofore, include the following: (1) There is relatively low power consumption; (2) The amount of high-speed analog circuitry is minimized; (3) The technique can be easily modified (by tailoring the reference voltage statistics) to provide non-linear transfer functions, e.g., a log function; (4) High spatial (time) resolution is easy to implement; and (5) Variable sampling rates are easily implemented.

DETAILED DESCRIPTION OF THE PREFERRED EMBODIMENT

Figure 1:
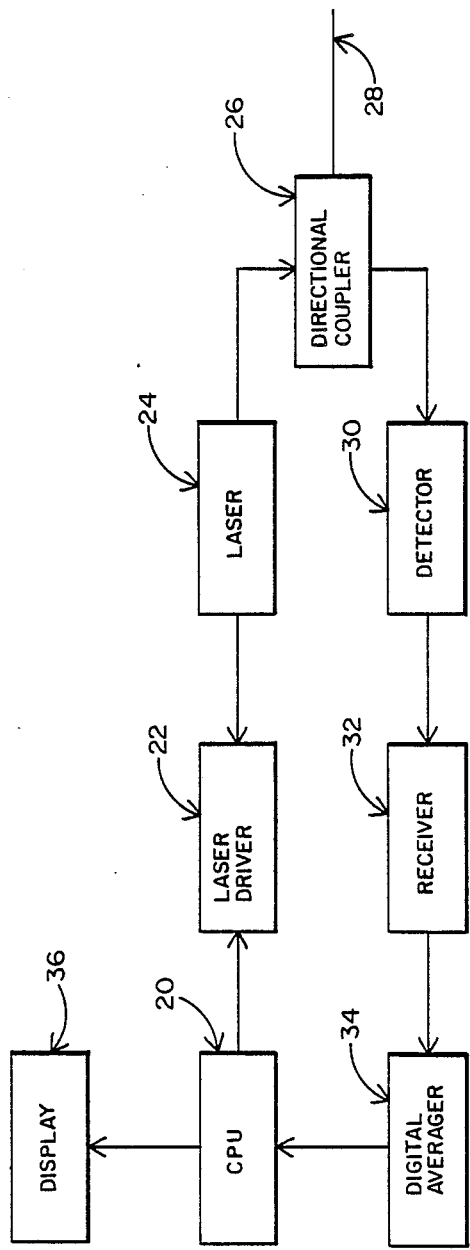
FIG. 1 is a simplified diagram of an OTDR system, which includes a digital averager.

FIG. 1 shows the basic components of an OTDR, which is controlled by CPU 20. CPU 20 controls a laser driver 22, which causes laser beam 24 to be delivered via a directional coupler 26 to the fiber strand (or strands) 28 which serve the OTDR.

Reflected laser signals returning from the fiber 28 are directed by the directional coupler 26 to a detector 30, from which the returning signal goes to a receiver 32, and then to a digital averager 34. From the digital averager, the returning signal is directed to the CPU 20, and thence to a display 36.

The information supplied by the OTDR is used to locate unnatural changes in the laser energy moving back and forth through the fiber. There is a natural attenuation in the laser energy throughout its travel. In fact, the energy level of the returning pulses at detector 30 may be in the neighborhood of 0.00001 of the energy level leaving laser 24. The purpose of the digital averager 34 is to separate the weak returning laser signal from the much greater noise level in which it is buried. The returning pulsed signals are digitized and added together. The noise, on the other hand, is uncorrelated (random) in its timing; and the net effect of the noise will tend to reach a zero average value. By continuing long enough in adding up the digitized coherent signals, a sufficient value is obtained to provide useful information.

The outgoing pulses generate reflections from every part of the fiber, but substantial scattering occurs. Normally, on a display graph, the energy of the recurring signal shows a gradually declining straight (logarithmic) curve. A greater decline generally occurs at a splice. If an abrupt signal decline occurs at any point, a problem is indicated. The cable may have been damaged; damage to an OTDR fiber generally indicates damage to all the fibers in the cable. Also, a sudden increase in signal may indicate damage, due to increased Fresnel reflection.

An ideal fiber would provide, in the logarithm domain, a straight line dropping to the right, with small splice drops periodically. The slope of the line indicates the attenuation of the fiber in decibels per kilometer. Distance and location are always indicated by elapsed time.

Figure 2:
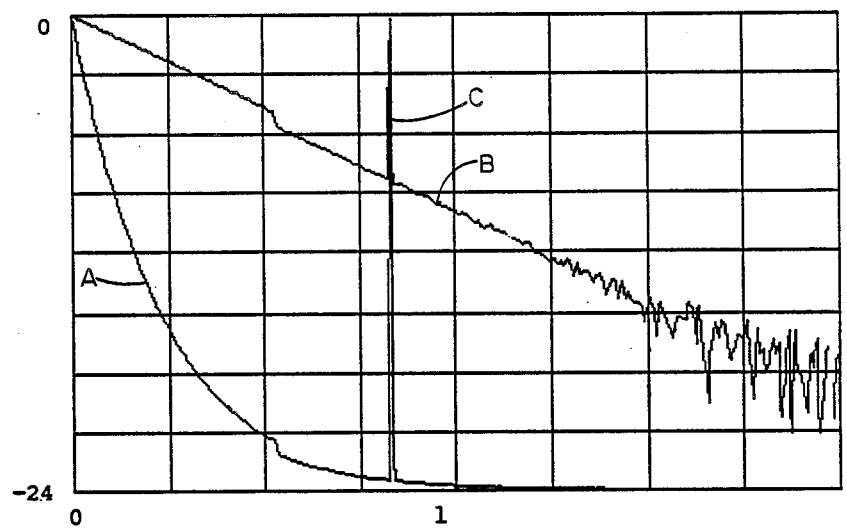
FIG. 2 shows a typical OTDR waveform display.

FIG. 2 shows typical OTDR waveforms, as provided by thousands of sweeps from end to end of the fiber strand under test. Waveform A is a normal waveform having exponential decay along the length of the fiber strand. Waveform B is a logarithmic waveform, based on the same testing as waveform A. Both waveforms A and B have a peak reflection at C. This may represent a Fresnel reflection effect due to a splice. The logarithmic waveform B is visible beyond the right end of waveform A.

There are two physical phenomena that occur during each waveform sweep; and they add by superposition. Some reflection just gives a replica of a transmitter pulse, as delayed in time. But the scattering is generating from every portion of the fiber, so the replica of the transmitter pulse at the particular reflection is added to the scattering prior to and after the reflection. The linear waveform A decays into the noise, with the result that the returning signal loses visibility slightly beyond the peak reflection C. In the log domain, the results are much different, permitting waveform B to continue well beyond the point where waveform A ceases to be visible.

The present invention is concerned with the problems and limitations of currently used digital averagers (see 34 in FIG. 1). The need for improvement has been explained in the Background of the Invention. The need is more significant in OTDRs intended for use with shorter fibers, such as hand held OTDRs, because the poor resolution of present averagers limits the number of sample voltages available from a waveform sweep of a relatively short fiber.

As stated above, the present invention deals with the resolution problem and with other problems of cost, high power, etc., by using a comparator to output a digital 1 or 0 signal each time the analog voltage signal from receiver 32 is compared to a randomly selected analog voltage signal value. The randomly selected voltage value is taken from the range of possible receiver signal values, and is fed to one input of the comparator during one full sweep of the waveform. A different randomly selected analog voltage value is used during the next waveform sweep. The more such sweeps are conducted, the greater is the accuracy of the waveform.

Figure 3:
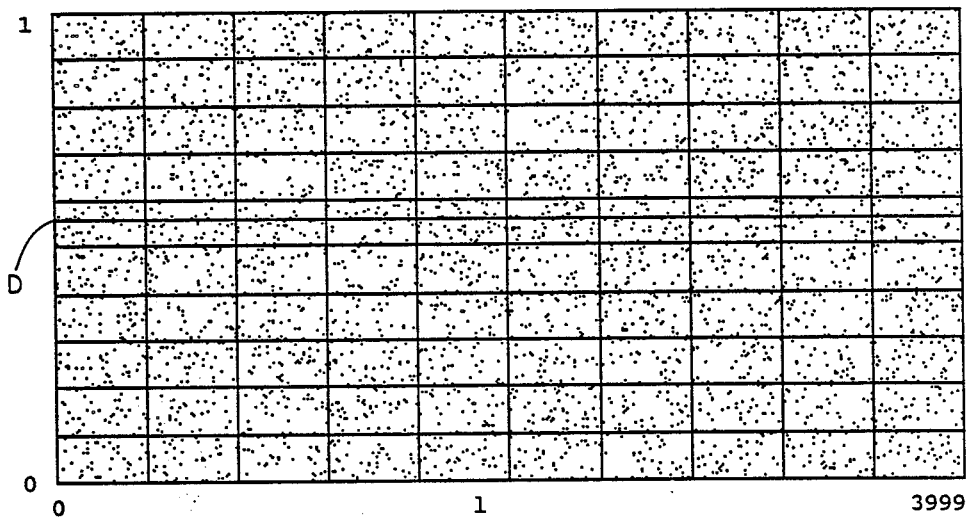
FIG. 3 shows a graph plotting the locations of randomly selected points within a given range.

FIG. 3 shows the result of using randomly selected voltage values chosen by a random number. It shows a range from 0 volts at the bottom to 1 volt at the top. The dots represent 4,000 uniformly distributed random numbers between 0 and 1. Assume a situation where the test voltage, i.e., the voltage to be measured is 0.5566, which is represented by line D on FIG. 3. The number of trials in which the random number was less than the "unknown" voltage (number below line D) is divided by the total number of trials (4,000), providing the value of 0.558. This is very close to the test value of 0.5566, having an error of approximately 0.25%. The accuracy of this measurement technique improves as the square root of the number trials.

Figure 4:
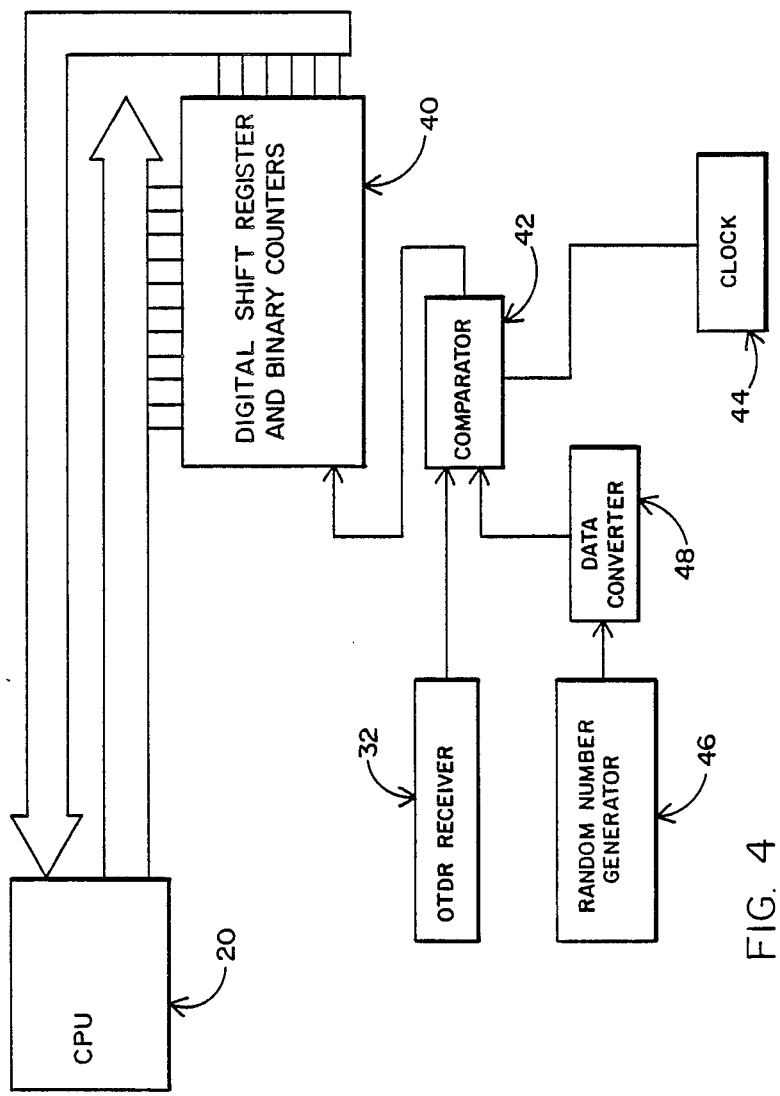
FIG. 4 is a diagram of the comparator and logic system of the present invention.

FIG. 4 is a diagram of the primary components of the present invention. A custom IC chip 40 contains a large number of binary counters, each of which is connected to a separate stage of a shift register. A single chip may include as many as 256 binary counters, each of which represents a "time-bin" along the waveform. A plurality of chips may be strung together to increase the number of available timebins.

The time-bins on chip 40 receive and accumulate the output signals (1 or 0) from a comparator 42, whose output frequency is controlled by a clock 44. One input to comparator 42 is the varying analog voltage from OTDR receiver 32 (FIG. 1). The other input to comparator 42 is a randomly generated analog voltage, whose value remains the same during one waveform sweep, and then is automatically changed for use during the next waveform sweep. The random voltage value may be provided by a random number generator, having a digital output, which is converted to an analog value by a D/A converter 48. From converter 48, an analog signal is sent to comparator 42, for comparison with the analog signal from receiver 32. The values delivered by converter 48 to comparator 42 should all be within the maximum voltage reflection obtainable from the laser 24 (FIG. 1).

Instead of using a random voltage generator, it would be possible to use an ordered comparison voltage. For example, the successive comparison voltages could be increased in steps of say 0.1 millivolts, proceeding all the way to the desired maximum of, say, 10 volts. However, the ordered selection of values would not produce a useful waveform as quickly as a random selections of values. In other words, a random selection will cause the waveform to converge more quickly toward its true shape.

Figure 5:
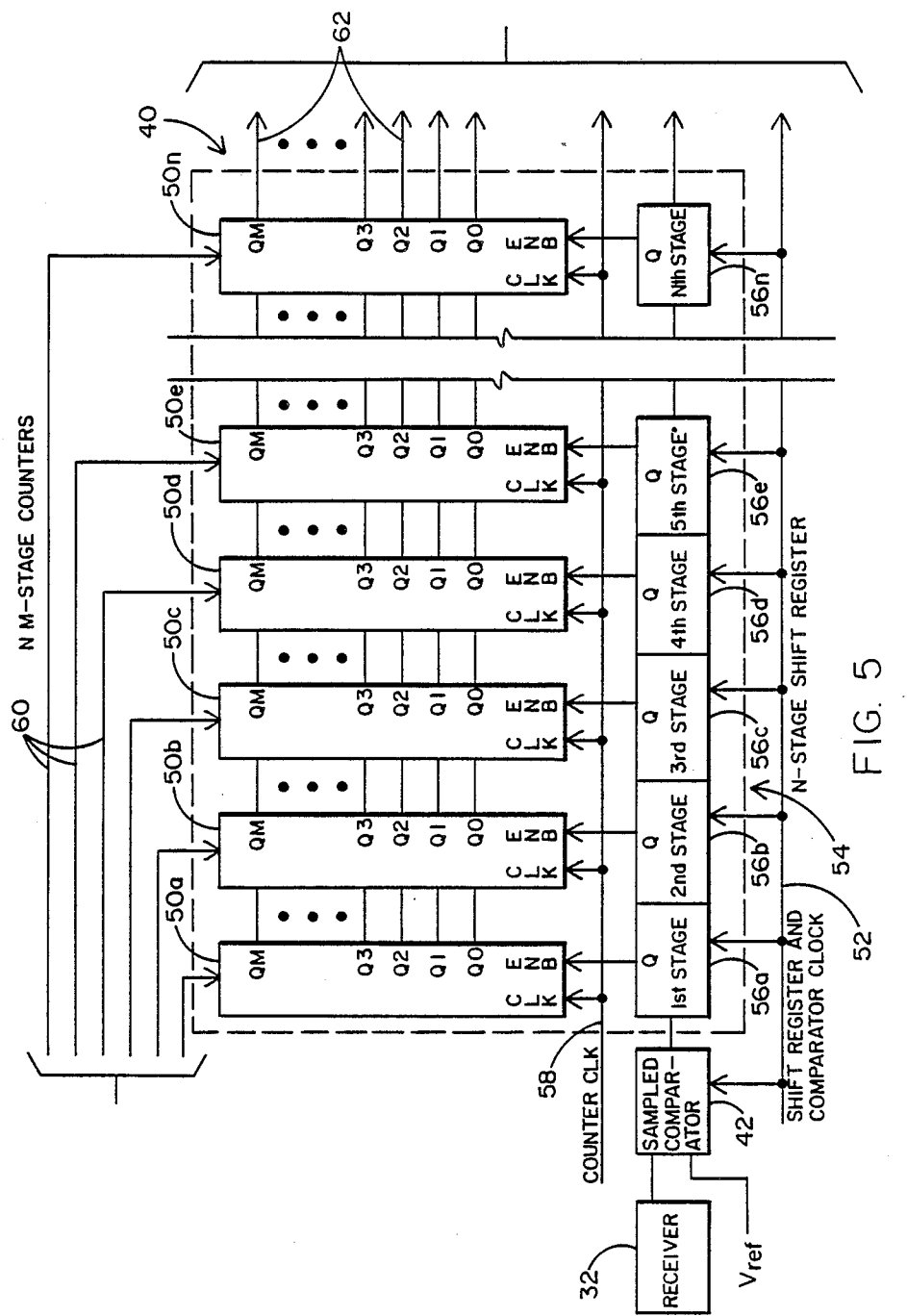
FIG. 5 is a more detailed diagram of the comparator and logic system designed for incorporation in each of a series of IC chips.

FIG. 5 shows a detailed diagram of the chip 40, its components, and the manner in which it is controlled. The chip 40, several of which may be strung together, contains a high-speed digital shift register and a number of binary counters (equal to the number of shift register stages). Means are provided whereby the contents of each counter may be read out from the chip over a multiplexed data bus.

A large number of binary counters 50a, 50b, 50c, etc., are provided on the chip 40, the boundaries of which are indicated by the dashed lines. The number of bits in each counter is determined by the number of sweeps which are to be co-added to provide a waveform. For example, if 1,000,000 sweeps are desired, the number of bits in each counter (to provide its output word) is 21. Each counter represents one "time-bin" in a waveform sweep. If each sweep includes 1,000 samples, the number of required counters (time-bins) is 1,000.

The comparator is controlled by clock 44, whose signals are carried on line 52. A shift register 54, having the same number of stages as the number of counters, directs each comparator output signal to a different stage 56a, 56b, 56c, etc., of the shift register. If a single chip 40 can contain 256 shift register stages and counters, four such chips will be required if 1,000 samples per waveform sweep are desired.

At each clock pulse on line 52, the instantaneous value of the analog voltage signal from receiver 32 is compared to the analog voltage value from voltage generator 46/48 (random number generator and D/A converter). The latter value remains the same for one waveform sweep, and is randomly changed for each subsequent sweep.

Each 1 or 0 signal from comparator 42 is stored in one stage of the shift register 54. The only high speed parts are the comparator and the shift register. These can be clocked to provide signals at 5 nS intervals, or faster if desired.

The counters may be relatively slow, and therefore low power, devices since the results for each time-bin must be updated only after the waveform sweep has been finished. A relatively slow counter clock provides signals on line 58 to transfer the stored shift register values (1 or 0) into the counter, at the end of each waveform sweep.

It is a simple matter to change the sample spacing (time and distance) by changing the frequency of the shift register/comparator clock.

Figure 6:
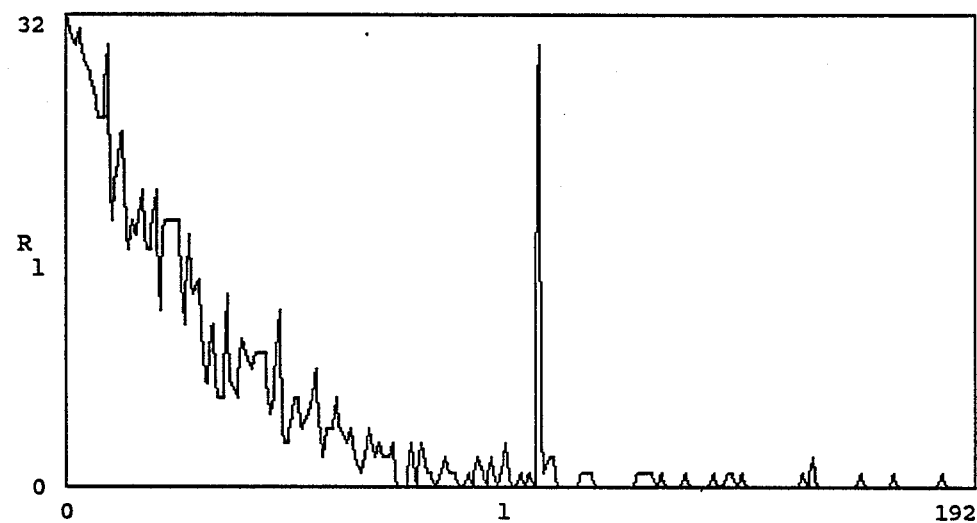
FIG. 6 is an OTDR display showing an OTDR waveform generated using the technique of the present invention, but limited to only 32 trials per point (time-bin), because of computer memory limitations.

The transfer of the accumulated data after the total number of desired waveform sweeps is controlled by counter output select lines 60 from the CPU. In FIG. 6, the select lines are shown as separate parallel lines. In order to avoid the multiplicity of such lines, a shift register concept could be used to interrogate the counters in sequence Each counter in turn outputs its accumulated word along parallel lines 62, each representing one of the binary bits in the counter, Q0, Q1, Q2, etc. to QM. These words from each counter are multiplexed serially to the CPU. Each word represents the value of one point along the waveform. Each point is spaced from the next by a time (and distance in the fiber) determined by the frequency of the comparator clock.

The transfer of words from the sequenced counters will not occur until the desired number of waveform sweeps (laser firings) have occurred. The chosen number of such sweeps will depend on the difficulties encountered in obtaining the desired signal to noise ratio. In an extreme case, 1,000,000 sweeps might be co-added. More often, the number of such sweeps might be 10,000. If the waveform is sampled (viewed) after, say, 10,000 sweeps, the waveform can be stored in the computer, and later another waveform representing 10,000 sweeps may be co-added to the prior waveform. The quality (accuracy) of the waveform continues to improve as the square of the number of sweeps FIG. 6 illustrates a waveform provided by the use of the present invention after only 32 sweeps, a number imposed on the experimenter by limited available computer memory. Although significant noise is apparent in FIG. 6, the general shape of the waveform has already developed. The signal-to-noise ratio will be gradually improved as additional waveform sweeps (laser firings) are performed.

The five advantages listed in the Summary of the Invention clearly are provided by the present invention. The A/D conversion is accomplished by the comparator with consummate ease.

The trade-off, or disadvantage, of the present technique is that the signal-to-noise ratio improvement efficiency is worse with this technique, and therefore more events must be averaged to achieve the same results. This is compensated for, however, because the number of points averaged per event can be made greater.

From the foregoing description, it will be apparent that the apparatus and method disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. In an optical time domain reflectometer which includes (a) a laser for firing signals into a fiber strand, (b) means for receiving and measuring continuously varying returning signals representing reflection values during a waveform sweep along the fiber strand, and (c) a computer controller, means for extracting useful waveform-determining values from the noise in which they are embedded, comprising:
   a comparator which receives two analog signals as first and second inputs, and outputs a 1 or 0 signal indicating which of the received signals is higher;
   means for directing the varying analog voltage values from the receiving/measuring means into the comparator as its first input signal;
   means for providing a large number of comparison voltage values, which are varied so as to be substantially evenly distributed in the range of possible values;
   each such comparison signal providing the second input signal to the comparator during a waveform sweep representing the length of the fiber strand;
   means for providing a series of time-bins, each of which represents a certain time, and thus a certain distance along the length of the fiber strand;
   clocking means for determining the frequency of output signals from the comparator; and
   means for causing each time-bin to accumulate the comparator output signals from a given segment of the waveform during successive waveform sweeps caused by successive laser firings.

2. The apparatus of claim 1 in which each time-bin comprises:
   multiple registers for temporarily storing successive output signals from the comparator;
   multiple binary counters, each connected to one of the registers; and
   clocking means for simultaneously transferring the stored information from each register into its counter after each waveform sweep.

3. The apparatus of claim 2 which also comprises:
   means controlled by the computer controller for interrogating each counter after a desired number of successive laser firings/waveform sweeps have been accomplished; and
   means responsive to the interrogating means for transferring to the computer controller, from each counter in succession, the word accumulated therein representing a binary number obtained by co-adding the values transferred to the counter from its connected register during the desired number of laser firings/waveform sweeps.

4. The apparatus of claim 1 in which:
   a random number generator is used to supply the comparison voltage values to the second input of the comparator.

5. The apparatus of claim 1 in which:
   an automatically varying ordered series of values is used to supply comparison voltage values to the second input of the comparator.

6. The apparatus of claim 2 which also comprises:
   one or more integrated circuit chips, each of which contains a large number of counters, and an equal number of shift register stages.

7. The apparatus of claim 2 in which:

the clocking means which times each output signal from the comparator also times the change from one temporary storage register to the next.

8. The apparatus of claim 7 which also comprises:
means for changing the frequency of the comparator/register clock, in order to change the resolution, in time and distance, of the waveform digital signal intervals.

9. In an optical time domain reflectometer which includes (a) a laser for firing signals into a fiber strand, (b) means for receiving and measuring continuously varying returning signals representing reflection values during a waveform sweep along the fiber strand, and (c) a computer controller, a method for extracting useful waveform-determining values from the noise in which they are embedded, comprising:
   directing to the first input of a comparator an analog voltage signal representing the values returning from the fiber strand during a given waveform sweep;
   directing to the second input of the comparator an analog voltage signal selected from a large number of signal values which are substantially evenly distributed in the range of possible values;
   maintaining the same signal at the second input of the comparator during one complete waveform sweep;
   outputting from the comparator at clocked intervals a digital signal indicating which of its input signals is instantaneously higher;
   storing each digital signal from the comparator in a different storage register stage;
   clocking the comparator output signals and the storage register stage inputs at a frequency which provides the desired waveform resolution;
   transferring the signal stored in each register stage to a separate counter at the end of a waveform sweep;
   changing the signal at the second input of the comparator;
   repeating during the next waveform sweep the steps taken during the previous waveform sweep;
   adding the values from successive sweeps into the respective counters; and
   repeating the foregoing process the number of times needed to obtain a desired signal-to-noise ratio in the recorded waveform.

* * * * *